(12) United States Patent
Robinson et al.

(10) Patent No.: US 9,819,834 B1
(45) Date of Patent: Nov. 14, 2017

(54) CONTROLLING USE OF OPTIONAL COLORS IN EXTENDED GAMUT PRINTING BASED ON PIXELS IN GAMUT EXTENSION

(71) Applicant: Xerox Corporation, Norwalk, CT (US)

(72) Inventors: David C. Robinson, Penfield, NY (US); Mark A. Smith, Rochester, NY (US)

(73) Assignee: Xerox Corporation, Norwalk, CT (US)

( * ) Notice: Subject to any disclaimer, the term of this patent is extended or adjusted under 35 U.S.C. 154(b) by 0 days.

(21) Appl. No.: 15/249,555

(22) Filed: Aug. 29, 2016

(51) Int. Cl.
  *G06K 15/02* (2006.01)
  *H04N 1/60* (2006.01)

(52) U.S. Cl.
  CPC ....... *H04N 1/6008* (2013.01); *G06K 15/1802* (2013.01); *G06K 15/184* (2013.01); *H04N 1/6066* (2013.01); *H04N 2201/0094* (2013.01)

(58) Field of Classification Search
  USPC .................. 358/1.2, 1.9–3.29, 504, 515–536
  See application file for complete search history.

(56) References Cited

U.S. PATENT DOCUMENTS

| | | | |
|---|---|---|---|
| 5,323,249 A | 6/1994 | Liang | |
| 5,748,342 A | 5/1998 | Usami | |
| 5,870,530 A | 2/1999 | Balasubramanian | |
| 6,038,373 A | 3/2000 | Matsumoto et al. | |
| 6,108,009 A | 8/2000 | Nishikawa | |
| 6,585,340 B1 * | 7/2003 | Borrell | B41J 2/17546 347/14 |
| 6,698,860 B2 | 3/2004 | Berns et al. | |
| 7,515,300 B2 | 4/2009 | Takahashi et al. | |
| 7,791,776 B2 | 9/2010 | Nielsen et al. | |
| 8,077,348 B2 | 12/2011 | Sato et al. | |
| 8,259,346 B2 | 9/2012 | Walton et al. | |
| 8,498,017 B2 | 7/2013 | Robinson | |
| 8,564,828 B2 | 10/2013 | Farrell et al. | |
| 8,736,930 B2 | 5/2014 | Robinson et al. | |
| 8,923,710 B2 | 12/2014 | Robinson et al. | |
| 9,070,076 B1 | 6/2015 | Smith et al. | |
| 9,077,939 B1 | 7/2015 | Ayash et al. | |
| 9,204,013 B2 | 12/2015 | Robinson et al. | |
| 2005/0243343 A1 | 11/2005 | Ng | |
| 2007/0171441 A1 | 7/2007 | Granger | |
| 2013/0250322 A1 * | 9/2013 | Kawabata | H04N 1/60 358/1.9 |
| 2013/0265598 A1 | 10/2013 | Donaldson et al. | |
| 2014/0009769 A1 | 1/2014 | Robinson et al. | |

* cited by examiner

Primary Examiner — Marcellus Augustin
(74) *Attorney, Agent, or Firm* — Gibb & Riley, LLC

(57) ABSTRACT

A processor of a printing device automatically raster image processes print data in a print job to produce a first, relatively low resolution, bitmap for printing the print job with the printer's main colors and one or more optional colors. The processor automatically compares the extended gamut of the lower-resolution first bitmap and the main color gamut of the printing engine to identify image quality improvement pixels of the extended gamut that are outside the main color gamut. The processor automatically either raster image processes the print data with the main colors and one of the optional colors, or raster image processes the print data with only the main colors, based on whether the number of image quality improvement pixels of the extended gamut that are outside the main color gamut exceeds a pixel quantity threshold, to produce a second, relatively higher resolution, bitmap.

20 Claims, 8 Drawing Sheets

| | 212 |
|---|---|

| | | |
|---|---|---|
| 150 → Automated 5th Color Section? | Yes | No |
| 152 → Threshold for Use of 5th Color: | 10 % | |
| 154 → Color Difference Threshold: | 2 ΔE | |
| 156 → Identify Extension Colorant: | Green | |
| 158 → Region of Color Space Selected: | 2 to 100 a* | -25 to 50 *b |
| 160 → Only Analyze First Pages? | Yes | No |
| Number of Pages: | 1-5 | |
| 162 → Exception Pages: | 2, 5, 9-11 | |

*FIG. 6*

CONTROLLING USE OF OPTIONAL COLORS IN EXTENDED GAMUT PRINTING BASED ON PIXELS IN GAMUT EXTENSION

BACKGROUND

Systems and methods herein generally relate to printers that use replaceable printing modules and more particularly to that controlling the use of the optional colors in extended gamut printing based on the pixels in the gamut extension.

In order to print using colors other than the printer's permanent colors that are used for all print jobs, or the vast majority of print jobs (e.g., colors other than red, green, blue (RGB) in a RGB printer; other than cyan, yellow, magenta, black (CMYK) in a CMYK printer, such as orange, green, blue, etc.), some printers include an additional housing (sometimes referred to as the fifth color housing, or Xth housing if more than 5 are enabled) that holds replaceable printing modules (sometimes referred to as a customer replaceable unit (CCU), fifth color module, spot color module, or imaging media cartridges) that are separate from the permanent color printing modules. This allows switching of the replaceable printing modules seamlessly in minutes; however, the fifth colorants (spot colors) are more expensive and used less frequently than the printer's permanent colors.

When job programming an extended gamut job, two destination profiles are applied to the job. One is for printing to the extended gamut (e.g., CMYK+Orange), and the other is for printing to the base gamut (CMYK). Users can use page exception programming to define the use of two different colorant combinations (e.g., CMYK and CMYK+Orange) on a page-by-page basis. However, users may not know what content resides on particular pages, and what pages would benefit from the use of the more expensive optional fifth colorant.

Extended gamut colorant destination profiles are designed to use the extended colorant in regions of color space that cannot be rendered accurately by the main colors alone. The reason why the extended gamut colorant is used in these regions is to facilitate smooth sweeps that progress across the gamut boundary of main color output to the region(s) requiring the extended gamut colorant for accurate color representation. Since the expensive extended gamut colorant will be used in color regions covered by the main colors, it is desirable not to use the extended gamut colorant if it provides no color gamut advantage verses the main colors alone.

SUMMARY

Exemplary printing devices herein include (among other components) a printing engine electrically connected to a processor. The printing engine has permanent color printing modules and replaceable printing modules electrically connected to the processor. The permanent color printing modules are permanently mounted within the printer and contain main colors. Each of the permanent color printing modules contains a single one of the main colors. The replaceable printing modules are temporarily mounted within the printer and contain optional colors. The optional colors are more expensive and are used less frequently than the main colors during printing operations. Each of the replaceable printing modules contains a single one of the optional colors.

In operation, the processor receives a print job, and the processor automatically raster image processes print data in the print job to produce a first, relatively low resolution, bitmap for printing the print job with the main colors and at least one of the optional colors. The processor automatically converts the first bitmap into a standardized color space (e.g., RGB, YCbCr, YUV, Lab, CMYK and Luv) to produce an extended gamut of the first bitmap. The processor also automatically identifies a main color gamut of the printing engine for printing with only the main colors. In one sense, a color gamut is a set of colors that can be accurately represented in a given circumstance, or by a certain output device. Thus, the main color gamut of the printing engine is all possible colors the printing engine can print using only the main colors, and the extended gamut is all possible colors the printing engine can print using the main colors and one of the optional colors. In addition, the main color gamut can includes a color distance threshold that expands an original color gamut of the printing engine by an acceptable error factor.

The processor automatically compares the extended gamut of the lower resolution first bitmap and the main color gamut of the printing engine to identify image quality improvement pixels of the extended gamut that are outside the main color gamut. The processor compares the image quality improvement pixels to a pixel quantity threshold to determine whether the image quality improvement pixels exceed the pixel quantity threshold and thereby identify whether the quality improvement pixels increase image quality. Then, the processor automatically raster image processes the print data to produce a second bitmap having a higher resolution relative to the first bitmap. The raster image processing is performed either with the main colors and one of the optional colors, if the image quality improvement pixels increase image quality, or with only the main colors, if the image quality improvement pixels do not increase image quality. Thus, the pixel quantity threshold defines whether the optional colors improve image quality an amount to justify the additional cost of the optional colors. In addition, a user interface of the printing device can provide an option to change the pixel quantity threshold.

After such a determination, the processor automatically either raster image processes the print data with the main colors and one of the optional colors, or raster image processes the print data with only the main colors, again based on whether the number of image quality improvement pixels of the extended gamut that are outside the main color gamut exceed the pixel quantity threshold, to produce a relatively higher resolution, second bitmap (the second bitmap has a higher resolution relative to the first bitmap).

While the determination of whether the number of image quality improvement pixels of the extended gamut that are outside the main color gamut exceed the pixel quantity threshold can be performed for the print job as a whole, in some situations, the first bitmap is for a single page of the print data, and the processor identifies image quality improvement pixels of the extended gamut that are outside the main color gamut individually for each page of the print data to evaluate whether to use the one or more of the optional colors with the main colors on a page-by-page basis.

The printing engine then prints the second bitmap to print the pages of the print job. To conserve resources, the processor can automatically delete the first bitmap before the printing engine prints the second bitmap.

Presented in method form, methods herein receive a print job into a printer having permanent color printing modules and replaceable printing modules. The permanent color printing modules are permanently mounted within the printer and contain main colors, and each of the permanent color printing modules contains a single one of the main colors. The replaceable printing modules are temporarily mounted within the printer and contain optional colors, and each the replaceable printing modules contains a single one of the optional colors. Further, the optional colors are more expensive and are used less frequently than the main colors during printing operations.

These methods raster image process print data in the print job using a processor of the printer to produce a first, lower resolution, bitmap for printing the print job with the main colors and one or more of the optional colors. Such methods convert the first bitmap into a standardized color space using the processor to produce an extended gamut of the first bitmap. In addition, methods herein identify a main color gamut of the printing engine for printing with only the main colors using the processor. The main color gamut of the printing engine is all possible colors the printing engine can print using only the main colors, and the extended gamut is all possible colors the printing engine can print using the main colors and one or more of the optional colors.

Thus, such methods compare the extended gamut of the first bitmap and the main color gamut of the printing engine (using the processor) to identify image quality improvement pixels of the extended gamut that are outside the main color gamut. This allows the methods to compare the image quality improvement pixels to a pixel quantity threshold (using the processor) to determine whether the image quality improvement pixels exceed the pixel quantity threshold and thereby identify whether the quality improvement pixels increase image quality. These methods then raster image processes the print data (using the processor) to produce a second bitmap having a higher resolution relative to the first bitmap. Such raster image processing is performed either with the main colors and one of the optional colors, if the image quality improvement pixels increase image quality, or with only the main colors, if the image quality improvement pixels do not increase image quality. Thus, the pixel quantity threshold defines whether the optional colors improve image quality an amount to justify an additional cost of the optional colors. In addition, these methods can receive, into a user interface of the printer, an option to change the pixel quantity threshold.

Therefore, these methods either raster image process the print data with the main colors and one of the optional colors, or raster image process the print data with only the main colors, based on whether the number of image quality improvement pixels of the extended gamut that are outside the main color gamut exceeds the pixel quantity threshold (using the processor); and this raster image processing produces a second bitmap having a higher resolution relative to the first bitmap. The first bitmap can be for a single page of the print data, and the process of comparing the gamuts identifies image quality improvement pixels of the extended gamut that are outside the main color gamut individually for each page of the print data, to evaluate whether to use said optional colors with said main colors on a page-by-page basis.

Then these methods print the second bitmap, using the printing engine, to print the pages of the print job. To conserve resources, these methods can delete the first bitmap (using the processor) before the printing engine prints the second bitmap.

These and other features are described in, or are apparent from, the following detailed description.

BRIEF DESCRIPTION OF THE DRAWINGS

Various exemplary systems and methods are described in detail below, with reference to the attached drawing figures, in which:

FIG. 6 is a user interface screenshot illustrating a display provided to the user.

DETAILED DESCRIPTION

Figure 1:
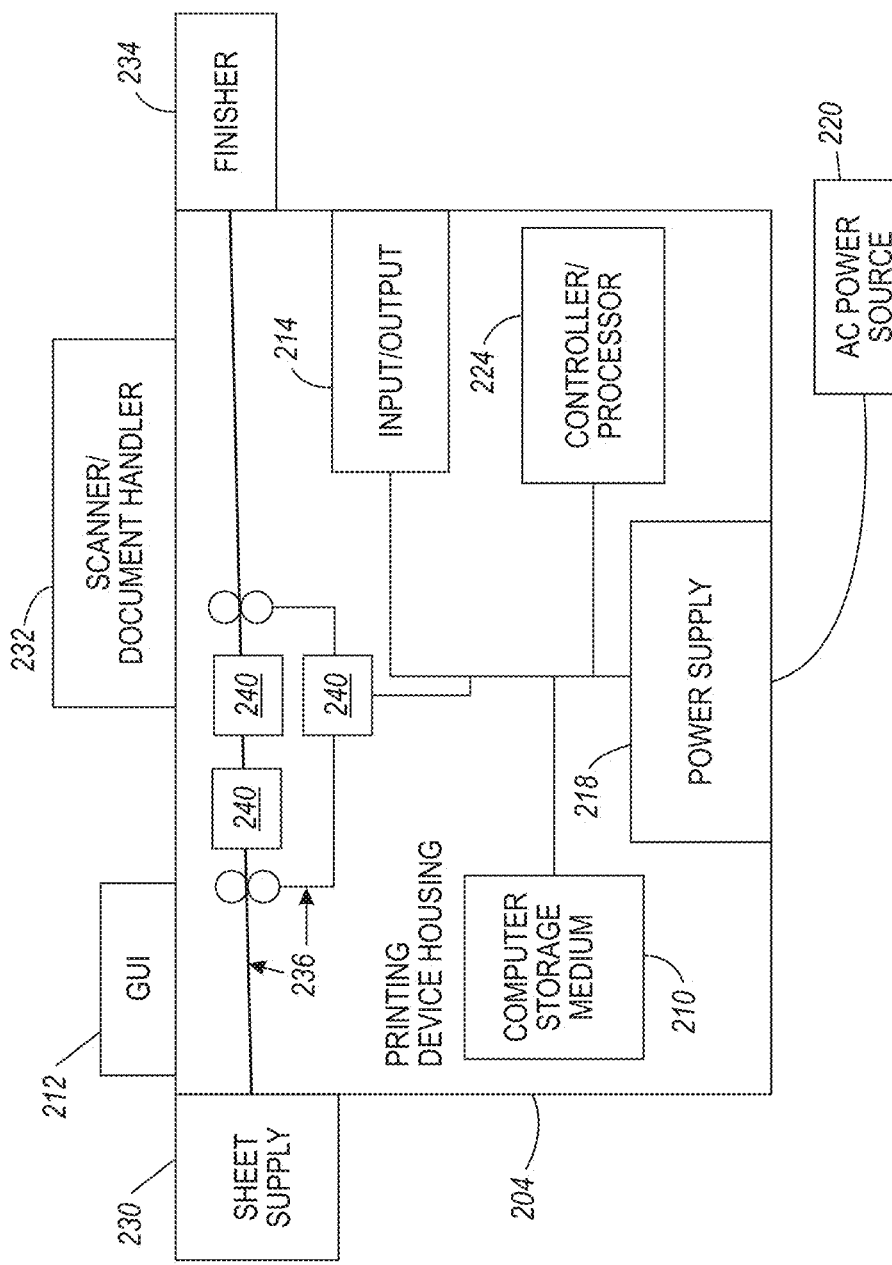
FIG. 1 is a schematic diagram illustrating printing devices herein.

As mentioned above, extended gamut colorants are expensive and, therefore, it is desirable not to use the extended gamut colorant if it provides no color gamut advantage verses the main colors alone. Therefore, the printing devices and methods disclosed herein provide the capability to automatically determine (on a page-by-page basis) whether the 5th colorant will benefit the printed output for a job. The capability comprehends all the input image types (e.g., RGB source, CMYK source, deviceN, spot) within the page description language (PDL) file and the job programming (e.g., spot rendering with the CMYK colorants or the CMYK+extended gamut colorant).

For example, with devices and methods herein, a menu option can be provided for "Automated 5th colorant application." When such an option is selected, the raster image processor produces two resolution outputs per page, an initial low resolution used for decision analysis, followed by a print resolution image, with the job programming determined by the low-resolution image decision. More specifically, the initial low-resolution image is produced using the main and optional color destination profile job programming. The resultant image is automatically analyzed using only the main color profile programmed on the job.

Thus, when the low-resolution image is complete, a gamut check library is invoked with the job identification main color and main color+optional color destination profiles. The gamut check library obtains the low-resolution initial image, determines the gamut boundary of main color only destination profile, obtains a pixel quantity threshold color standard difference value from defined location, converts main color+optional color data to color standard measures, determines the main color+optional color image quality improvement pixels that lie outside the main color gamut boundary by more than the pixel quantity threshold, and the image quality improvement pixels qualifying for the above are compared to the total number of image quality improvement pixels. If the benefiting image quality improvement pixels are above a pre-defined pixel quantity threshold (e.g., 10%), the page programming for main color+optional color is used on the print resolution image. If not, the page programming is adjusted to use the main color only destination profile for the print resolution image. After the print resolution image page is raster image processed, the initial low-resolution image is deleted.

Thus, instead of displaying a gamut comparison to allow users to manually determine whether optional colorants will be utilized, devices and methods herein provide an automatic determination as whether the optional colorant has significant added value over the main color only outcome. Based on the decision of whether to use the optional colorant, each individual page is raster image processed at the higher print resolution and such processing is repeated for all pages.

Therefore, the devices and methods disclosed herein provide automated page-by-page optimal raster image processing for main color and main color+optional color print outcomes. All the color spaces in the PDL (RGB, CMYK, Spots, Separation, DeviceN) are rendered by the raster image processor (containing all the raster image processing complexity to the main color+optional color print space. This print space is then compared to the possible main color only print space to determine the benefiting image quality improvement pixels within a job/page. The reduced resolution initial image used for the comparison minimizes the impact on raster image processing performance.

In addition, these devices and methods can use any number of main and extension colorants, and enable comparison of image quality benefits for any set of different profiles. For example, a large drop size artisan destination profile can be compared with a small drop size artisan destination profile.

FIG. 1 illustrates many components of printer structures 204 herein that can comprise, for example, a printer, copier, multi-function machine, multi-function device (MFD), etc. The printing device 204 includes a controller/tangible processor 224 and a communications port (input/output) 214 operatively connected to the tangible processor 224 and to a computerized network external to the printing device 204. Also, the printing device 204 can include at least one accessory functional component, such as a graphical user interface (GUI) assembly 212. The user may receive messages, instructions, and menu options from, and enter instructions through, the graphical user interface or control panel 212.

The input/output device 214 is used for communications to and from the printing device 204 and comprises a wired device or wireless device (of any form, whether currently known or developed in the future). The tangible processor 224 controls the various actions of the printing device 204. A non-transitory, tangible, computer storage medium device 210 (which can be optical, magnetic, capacitor based, etc., and is different from a transitory signal) is readable by the tangible processor 224 and stores instructions that the tangible processor 224 executes to allow the computerized device to perform its various functions, such as those described herein. Thus, as shown in FIG. 1, a body housing has one or more functional components that operate on power supplied from an alternating current (AC) source 220 by the power supply 218. The power supply 218 can comprise a common power conversion unit, power storage element (e.g., a battery, etc), etc.

The printing device 204 includes at least one marking device (printing engine(s)) 240 that use marking material, and are operatively connected to a specialized image processor 224 (that is different than a general purpose computer because it is specialized for processing image data), a media path 236 positioned to supply continuous media or sheets of media from a sheet supply 230 to the marking device(s) 240, etc. After receiving various markings from the printing engine(s) 240, the sheets of media can optionally pass to a finisher 234 which can fold, staple, sort, etc., the various printed sheets. Also, the printing device 204 can include at least one accessory functional component (such as a scanner/document handler 232 (automatic document feeder (ADF)), etc.) that also operate on the power supplied from the external power source 220 (through the power supply 218).

The one or more printing engines 240 are intended to illustrate any marking device that applies marking material (toner, inks, plastics, organic material, etc.) to continuous media, sheets of media, fixed platforms, etc., in two- or three-dimensional printing processes, whether currently known or developed in the future. The printing engines 240 can include, for example, devices that use electrostatic toner printers, inkjet printheads, contact printheads, three-dimensional printers, etc. The one or more printing engines 240 can include, for example, devices that use a photoreceptor belt or an intermediate transfer belt or devices that print directly to print media (e.g., inkjet printers, ribbon-based contact printers, etc.).

Figure 2:
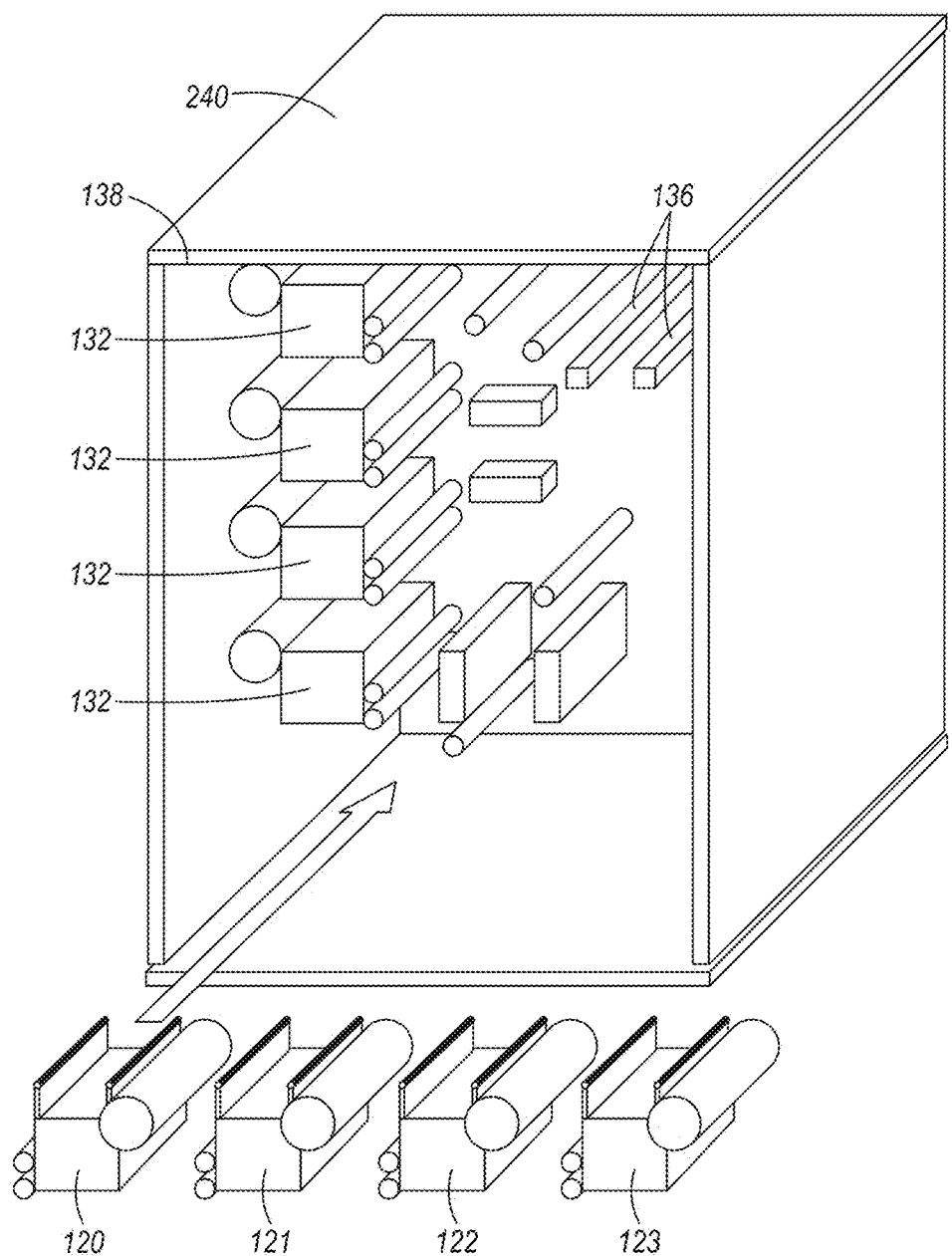
FIGS. 2 and 3 are schematic diagram illustrating the use of optional replacement printing modules with printing devices herein.

FIG. 2 illustrates a printing device or printing engine 240 (which is sometimes referred to as an image output terminal) having a frame 138. The printing device 240 includes various main (permanent) printing modules 132 that print using the printer's permanent colors. The main printing modules 132 are used for virtually all print jobs, and are not replaceable by printer users, and are only replaceable as part of a repair operation performed by repair professionals. Thus, the replaceable printing modules 120-123 are regularly switched to provide different colors during different printing operations, while the main printing modules 132 are only replaced when they are defective and the printer is being serviced for repair.

Figure 3:
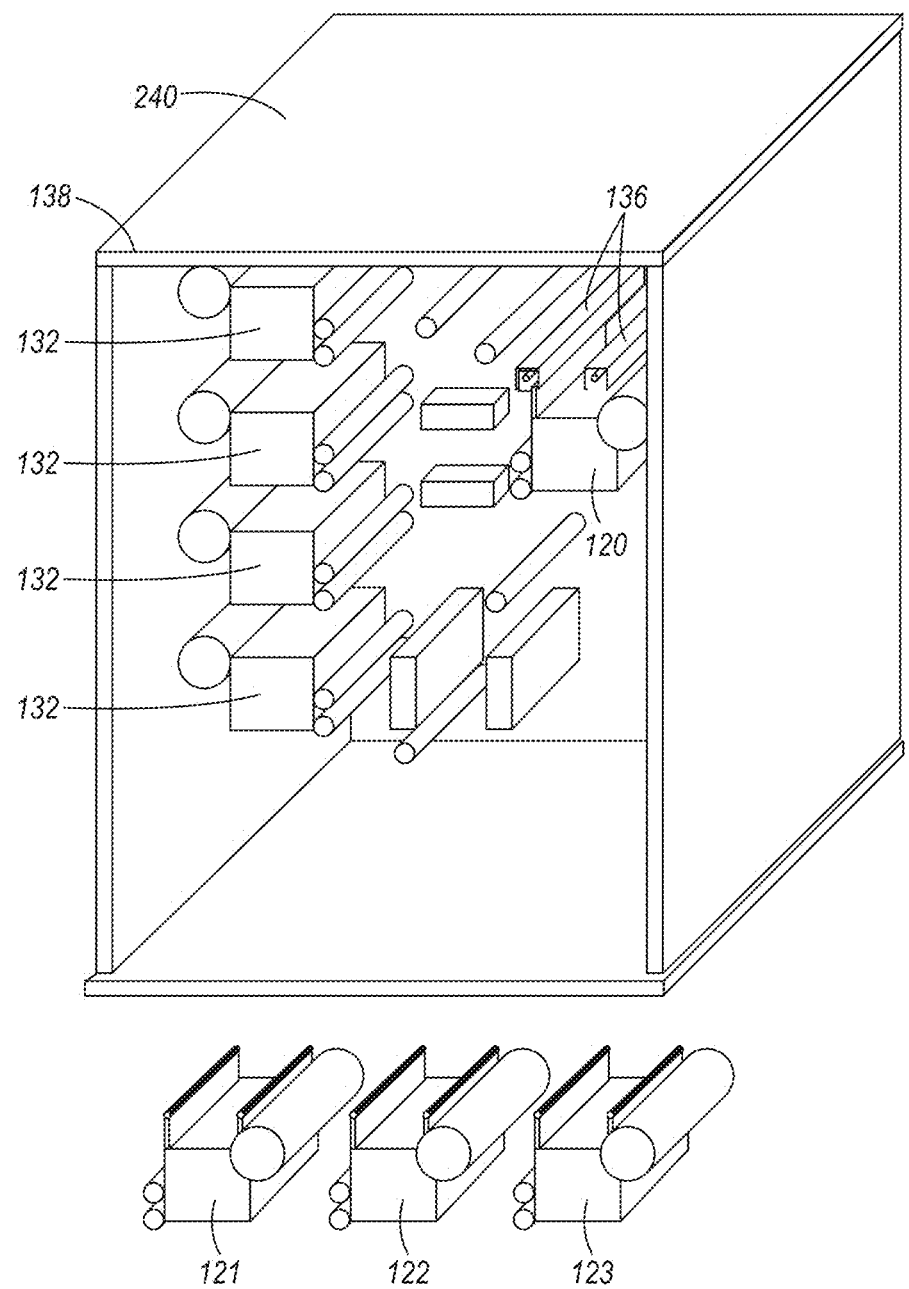

The replaceable printing modules 120-123 are sometimes positioned in a receptacle 136 of the printing device 240, and print using colors that only appear in a limited number of specialty print jobs. The receptacle 136 can include housing slots that are similarly sized and shaped to match the size and shape of connections of the replaceable printing modules 120-123, allowing the slots to hold the replaceable printing modules. FIG. 3 illustrates one of the replaceable printing modules 120-123 mounted in the receptacle 136 (replaceable printing module 120 mounted in receptacle 136). In order to determine which replaceable printing modules 120-123 to insert into the receptacle 136, the processing shown in the flowchart in FIG. 4 is used.

Figure 4:
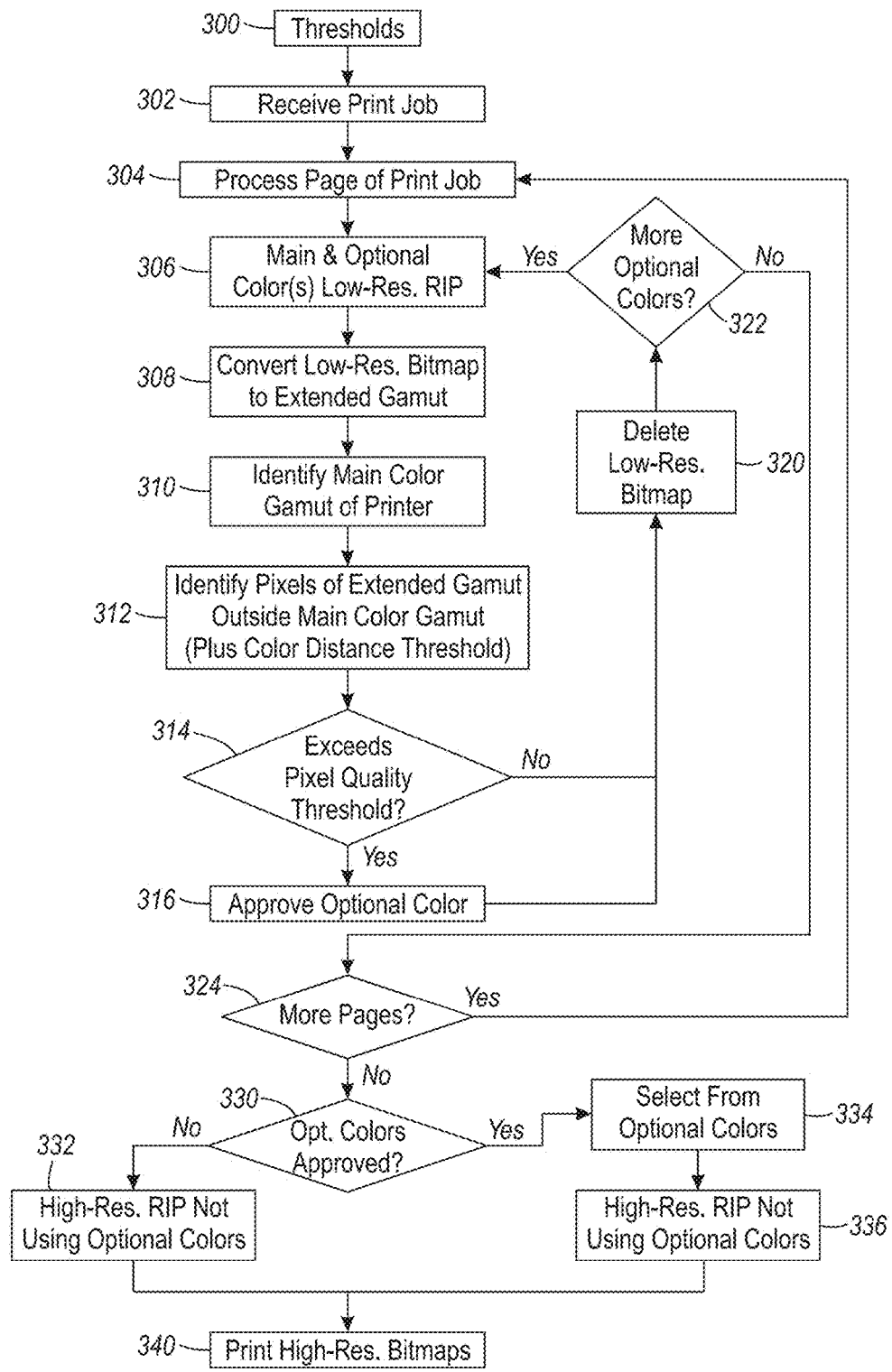
FIG. 4 is a flow diagram of various methods herein.

More specifically, as shown in FIG. 4, in item 300, illustrates the various thresholds used herein (e.g., pixel quantity threshold, color distance threshold, etc.) that are permanently set, user set, or user-adjustable. Item 302 shows the receipt of a print job into a printer having permanent color printing modules and replaceable printing modules. As shown in FIGS. 2-3, the permanent color printing modules 132 are permanently mounted within the printer 204 and contain main colors, and each of the permanent color printing modules 132 contains a single one of the main colors. The replaceable printing modules 120-123 are temporarily mounted within the printer and contain optional colors, and each the replaceable printing modules 120-123 contains a single one of the optional colors. Further, the optional colors are more expensive and are used less frequently than the main colors during printing operations. One optional color (or combination of optional colors) on one page of the print job can be processed at a time, starting in item 304.

In item 306, these methods raster image process print data in the print job using a processor of the printer to produce a first, lower resolution, bitmap for printing one page of the print job with all the main colors and only one of the optional colors. Thus, processing in items 306-316, described below, is performed for one optional color (or combination of optional colors) on one page. Such methods convert the first bitmap into a standardized color space using the processor to produce an extended gamut of the first bitmap in item 308. In addition, in item 310, methods herein identify a main color gamut of the printing engine for printing with only the main colors using the processor.

Figure 5A:
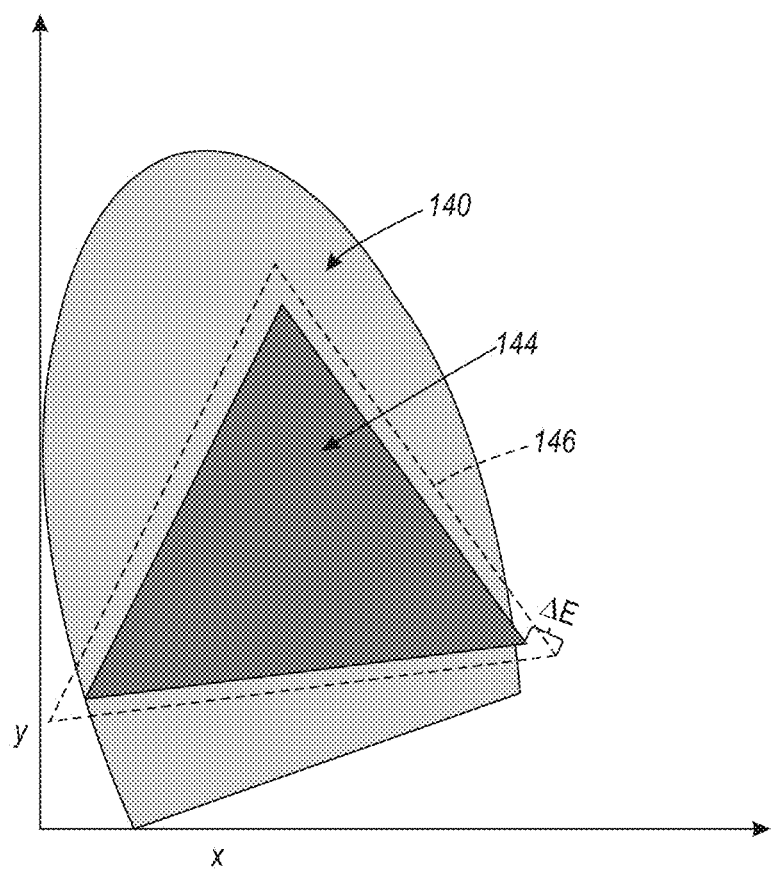
FIG. 5A-5C are charts showing different gamuts.

FIG. 5A graphically illustrates how the extended gamut 140 extends the possible colors that can be produced beyond an original color gamut 144 of the printer. The original color gamut is a subset of colors which can be accurately represented in a given circumstance, such as within a given color space or by a certain output device. The original color gamut 144 of the printing engine is all possible colors the printing engine can print using only the main colors, and the extended gamut 140 is all possible colors the printing engine can print using the main colors and one of the optional colors. In addition, the main color gamut 146 includes a color distance threshold that expands the original color gamut 144 of the printing engine by an acceptable error factor (ΔE). For example, the error factor expands the original color gamut 144 by any amount (e.g., 2 ΔE, 4 ΔE, 7 ΔE, etc., or 5%, 10%, 20%, etc.) to avoid including pixels that are not significantly different in color from the pixels in the original color gamut 144 in the analysis.

Figure 5B:
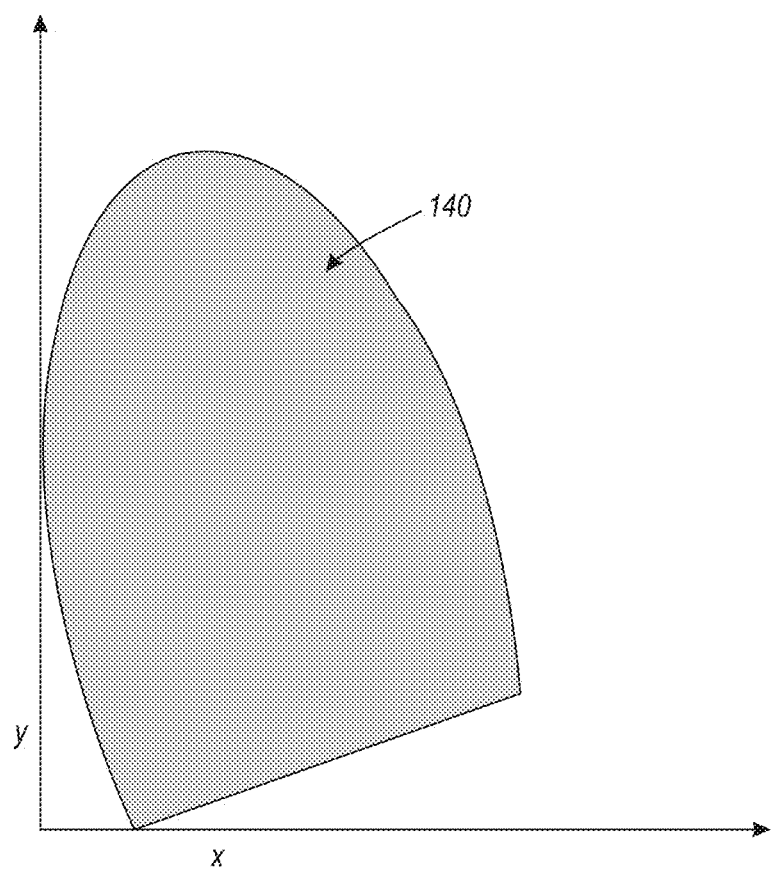
Figure 5C:
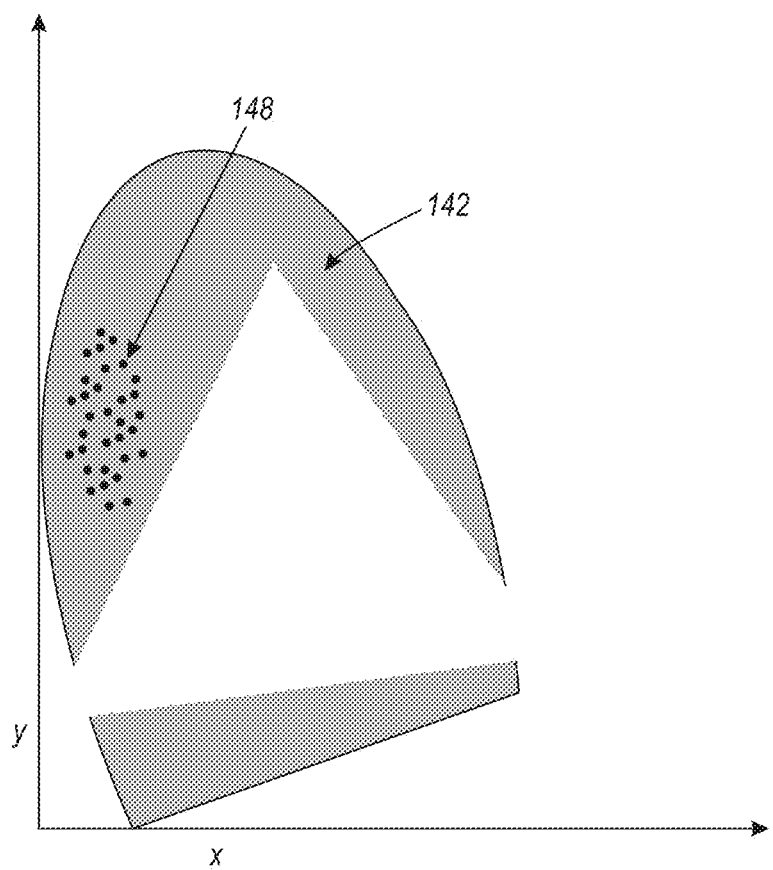

FIG. 5B illustrates the extended gamut 140 alone, and FIG. 5C illustrates the portion 142 of the extended gamut 140 that is outside the main color gamut 146. Additionally, items 148 in FIG. 5C illustrate the image quality improvement pixels of the extended gamut 140 that are outside the main color gamut 146. The processing described below determines how many (or what percentage of) pixels 148 of the first, low-resolution bitmap (represented in the standardized color space) lie in the region 142 of the extended color gamut 140 that is outside the main color gamut 146. Any color space can be used by methods and devices herein including, for example, RGB (red, green, blue), Lab (CIELAB (or L*a*b*), YUV (luma (Y') and chrominance (UV)), YCrCb (Y' is the luma component, and CB and CR are the blue-difference and red-difference chroma components), CMYK (cyan, magenta, yellow, black, etc.), etc.

In item 312, such methods compare the extended gamut 142 of the first bitmap and the main color gamut 146 of the printing engine (using the processor) to identify image quality improvement pixels 148 of the extended gamut that are outside the main color gamut 146. In other words, the processing in item 312 determines how many (or what percentage of) pixels of the first, low-resolution bitmap (represented in the standardized color space) lie in the region 142 of the extended gamut 140 that is outside the main color gamut 146.

This allows the methods to compare the number (or percentage) of image quality improvement pixels 148 to a pixel quantity threshold (using the processor) in item 314 to determine whether the gamut difference of the image quality improvement pixels 148 exceeds the pixel quantity threshold and thereby identify whether the quality improvement pixels 148 increase image quality. Thus, the quality improvement pixels 148, for a given optional color on a given page, are deemed to increase image quality for that page when the number of image quality improvement pixels 148 exceeds the pixel quantity threshold pixel number (e.g., when more than 500 of the page's pixels are outside the main color gamut), or when the image quality improvement pixels 148 are a percentage of the page's total pixel count that exceeds the pixel quantity threshold pixel percentage (e.g., when more than 10% of the page's pixels are outside the main color gamut). If the quality improvement pixels 148 increase image quality for the page and optional color being processed, that optional color is approved for use with that page in item 316. As discussed below in item 334, even if multiple optional colors are approved for a page or print job, only a limited number of the approved optional colors may be used, depending on the printer's capabilities.

Whether the quality improvement pixels 148 increase image quality for the page and optional color being processed or not, the flow moves to item 320, where the low resolution bitmap for the page and optional color is deleted, and then to item 322 to see if there are any more optional colors to process for that page. If there are more optional colors to process for the page identified in item 304, processing moves from item 322 back to item 306 to generate a different low-resolution bitmap for the same page, but for a different optional color. For example, if the printer can only use one optional color at a time, each optional color is evaluated independently; however, if the printer can use multiple optional colors simultaneously, each optional color is evaluated alone, and then each combination of optional colors is evaluated independently of the other optional color combinations. Otherwise, if there are no more optional colors to process for the page being evaluated, processing flows from item 322 to item 324 to see if there are any additional pages to process. If there are more pages to process in item 324, the flow returns to item 304 to process the next page.

Once all optional colors on all pages are processed in items 304-316, decision box 330 determines if there were any optional colors (or combination of optional colors) approved for any pages of the print job. If there were not any optional colors approved for any pages of the print job, the print job is raster image processed using only the main colors, and not using any optional colors in item 332. The raster image processing in item 332 (and 336 discussed below) produces a second, relatively high-resolution bitmap having a higher resolution relative to the first, low-resolution bitmap generated in item 306, discussed above. For example, the relatively high-resolution bitmap produced in items 332 and 336 can have any increased pixel resolution (e.g., pixel per unit area) that is, for example, 5 times, 50 times, 500 times, etc., the relatively low-resolution bitmap produced in item 306.

However, if there were any optional colors approved for any pages of the print job, processing instead flows from item 330 to item 334 to select which of those optional colors will be used with the print job. The selection process in item 334 generally makes selections so that the replaceable printing modules 120-123 are not changed during the printing of the print job. Therefore, the selection process in item 334 determines how many replaceable printing modules 120-123 the printing device can maintain. Then, the selection processing in the item 334 determines which optional color(s) is/are used the most (e.g., on the most number of pages, on the greatest amount of printing area, are the most important, etc.) to select which optional color(s) will be utilized for printing the print job.

For example, a printing device may be a 6-color device that includes 4 main colors and 2 optional colors. Further, in this example, a print job of 10 pages may have approved a first color on 9 of the pages and a second color on 7 of the pages, while the remaining colors were approved on only 5 or less of the pages of the print job. Therefore, in this example, the selection process in item 334 would select only the first and second colors as the optional colors to use (in combination with the main colors) with the print job.

After the optional color(s) are selected in item 334, a relatively high-resolution bitmap produced using the main colors and the selected optional color(s) is produced in item 336. Again, the bitmap produced in item 336 has a higher resolution relative to the first, low-resolution bitmap generated in item 306. In item 340, the printer utilizes the high resolution bitmap produced in item 332, or the high resolution bitmap produced in item 336, to print the print job.

Therefore, these methods either raster image process the print data with the main colors only in item 332, or raster image process the print data with the main colors and one or more of the optional colors in item 336, based on whether the quantity of image quality improvement pixels 148 of the extended gamut that are outside the main color gamut 142 exceeds the pixel quantity threshold (using the processor) as determined in item 314. This second raster image processing (332 and 336) produces a second bitmap having a higher resolution relative to the first bitmap in item 306.

These methods can receive, into the user interface 212 of the printer 204, an option to change the threshold for gamut comparison (the pixel quantity threshold) in item 300. This is shown in FIG. 6 where item 150 allows the user to choose automated color selection, item 152 allows the user to set or change the pixel quantity threshold, and item 154 allows the user to set or change the color difference threshold. For example, the pixel quantity threshold can be in the form of a percentage, a pixel count, etc.; and the color difference threshold can similarly be in a percentage, etc. Further, the devices and methods herein allow the user to select which gamut extension colorant to use, as shown in item 156.

Also, as shown in FIG. 6, additional user interface 212 controls provide that the comparison can be applied in certain regions of color space, where item 158 allows the user to enter, for example, the chroma range for automated color selection analysis (where, in L*a*b* color space, a* and b* represent chroma measures). For example, dark colors may not be of interest and would not be highlighted if they have a printed benefit. Also, the systems herein allow a number of pages (e.g., first 10% of pages, first 5 pages, etc.) of the job to be initially processed, for an optional color determination to be made; and then the entire job is high-resolution raster image processed according to such a determination, as shown in item 160 (which includes an entry field to identify the "first" pages). Further, such features work on an exception page basis, where only certain user-identified pages have the optional colorant decision process applied (and exception pages manually identified by the user do not have the automated colorant selection applied, as shown in item 162 in FIG. 6).

Thus, as shown in FIGS. 1-4, exemplary printing devices 204 herein include (among other components) a printing engine 240 electrically connected to a processor 224. The printing engine 240 has permanent color printing modules 132 and replaceable printing modules 120-123 electrically connected to the processor 224. The permanent color printing modules 132 are permanently mounted within the printer and contain main colors. Each of the permanent color printing modules 132 contains a single one of the main colors. The replaceable printing modules 120-123 are temporarily mounted within the printer and contain optional colors. The optional colors are more expensive and are used less frequently than the main colors during printing operations. Each of the replaceable printing modules 120-123 contains a single one of the optional colors.

In operation, the processor 224 receives a print job, and the processor 224 automatically raster image processes print data in the print job to produce a first, relatively low resolution, bitmap for printing the print job with the main colors and at least one of the optional colors. The processor 224 automatically converts the first bitmap into a standardized color space (e.g., RGB, YCbCr, YUV, Lab, CMYK and Luv) to produce an extended gamut of the first bitmap. The processor 224 also automatically identifies a main color gamut of the printing engine 240 for printing with only the main colors.

The processor 224 automatically compares the extended gamut of the lower resolution first bitmap and the main color gamut of the printing engine 240 to identify image quality improvement pixels of the extended gamut that are outside the main color gamut. The processor 224 compares the image quality improvement pixels to a pixel quantity threshold to determine whether the image quality improvement pixels exceed the pixel quantity threshold and thereby identify whether the quality improvement pixels increase image quality.

Then, the processor 224 automatically raster image processes the print data to produce a second bitmap having a higher resolution relative to the first bitmap. The raster image processing is performed either with the main colors and one of the optional colors, if the image quality improvement pixels increase image quality, or with only the main colors, if the image quality improvement pixels do not increase image quality. Thus, the pixel quantity threshold defines whether the optional colors improve image quality an amount to justify the additional cost of the optional colors. In addition, a user interface of the printing device can provide an option to change the pixel quantity threshold.

After such a determination, the processor 224 automatically either raster image processes the print data with the main colors and one of the optional colors, or raster image processes the print data with only the main colors, again based on whether the number of image quality improvement pixels of the extended gamut that are outside the main color gamut exceed the pixel quantity threshold, to produce a relatively higher resolution, second bitmap (the second bitmap has a higher resolution relative to the first bitmap).

While the determination of whether the number of image quality improvement pixels of the extended gamut that are outside the main color gamut exceed the pixel quantity threshold can be performed for the print job as a whole, in some situations, the first bitmap is for a single page of the print data, and the processor 224 identifies image quality improvement pixels of the extended gamut that are outside the main color gamut individually for each page of the print data to evaluate whether to use the one or more of the optional colors with the main colors on a page-by-page basis.

The printing engine 240 then prints the second bitmap to print the pages of the print job. To conserve storage resources 210 and processing resources 224, the processor 224 can automatically delete the first bitmap before the printing engine 240 prints the second bitmap.

The hardware described herein plays a significant part in permitting the foregoing method to be performed, rather than function solely as a mechanism for permitting a solution to be achieved more quickly, (i.e., through the utilization of a computer for performing calculations). As would be understood by one ordinarily skilled in the art, the processes described herein cannot be performed by a human alone (or one operating with a pen and a pad of paper) and instead such processes can only be performed by a machine (especially with the image information data being processed, and the speed at which such data is processed). Specifically, processes such as receiving electronic image streams, evaluating spectral image quality, determining if pixels are outside a gamut, etc., requires the utilization of different specialized machines, and humans performing such processing would not produce useful results because of the time lag, inconsistency, and inaccuracy humans would introduce into the results.

Further, such machine-only processes are not mere "post-solution activity" because the analysis of the gamuts and creation of bitmaps is used with a physical printer that is printing print jobs on sheets of media. Similarly, the electronic transmissions of the print jobs utilize special-purpose equipment (printing equipment, print servers, print job routers, etc.) that are distinct from a general-purpose processor. Also, the printing is integral with the process performed by the methods herein, and is not mere post-solution activity, because the print job is executed (potentially with an optional color) to perform printing operations with printing machines. In other words, these various machines are integral with the methods herein because the methods cannot be performed without the machines (and cannot be performed by humans alone).

Additionally, the methods herein solve many highly complex technological problems. For example, as mentioned above, image quality issues occur when printing with optional print colors, and users spend large amounts of funds (sometimes incorrectly) unnecessarily using expensive ink that does not increase image quality. Methods herein solve this technological problem by avoiding the need for users to determine when to use the optional colors with print jobs. This reduces the amount of electronic storage that a printer must maintain by only using a low-resolution image to perform gamut comparison, and also reduces the technological complexity by not needing to have the user's program print jobs for the use of optional colors. By granting such benefits to providers, the methods herein reduce the amount and complexity of hardware and software needed to be purchased, installed, and maintained by print professionals, thereby solving a substantial technological problem that is experienced today.

A raster image processor (RIP) is a component used in a printing system that produces a raster image also known as a bitmap. The bitmap is then sent to a printing device for output. Raster image processing is the process that turns vector digital information into a high-resolution raster image. A "pixel" refers to the smallest segment into which an image can be divided. Received image quality improvement pixels of an input image are associated with a color value defined in terms of a color space, such as color, intensity, lightness, brightness, or some mathematical transformation thereof. Pixel color values may be converted to a chrominance-luminance space using, for instance, a RBG-to-YCbCr converter to obtain luminance (Y) and chrominance (Cb,Cr) values. It should be appreciated that image quality improvement pixels may be represented by values other than RGB or YCbCr. Further, the terms automated or automatically mean that once a process is started (by a machine or a user), one or more machines perform the process without further input from any user. In the drawings herein, the same identification numeral identifies the same or similar item.

It will be appreciated that the above-disclosed and other features and functions, or alternatives thereof, may be desirably combined into many other different systems or applications. Various presently unforeseen or unanticipated alternatives, modifications, variations, or improvements therein may be subsequently made by those skilled in the art which are also intended to be encompassed by the following claims. Unless specifically defined in a specific claim itself, steps or components of the systems and methods herein cannot be implied or imported from any above example as limitations to any particular order, number, position, size, shape, angle, color, or material.

What is claimed is:

1. A printer comprising:
a processor; and
a printing engine electrically connected to said processor, said printing engine comprising:
permanent color printing modules electrically connected to said processor; and
replaceable printing modules electrically connected to said processor,
said permanent color printing modules contain main colors,
said replaceable printing modules contain optional colors,
said processor receives a print job,
said processor automatically raster image processes print data in said print job to produce a first bitmap for printing said print job with said main colors and one of said optional colors,
said processor automatically converts said first bitmap into a standardized color space to produce an extended gamut of said first bitmap,
said processor automatically identifies a main color gamut of said printing engine for printing with only said main colors,
said processor automatically compares said extended gamut of said first bitmap and said main color gamut of said printing engine to identify image quality improvement pixels of said extended gamut that are outside said main color gamut,
said processor compares said image quality improvement pixels to a pixel quantity threshold to determine that said quality improvement pixels increase image quality when said image quality improvement pixels exceed said pixel quantity threshold,
said processor automatically raster image processes of said print data in said print job to produce a second bitmap having a higher resolution relative to said first bitmap, said processor produces said second bitmap with said optional colors only if said image quality improvement pixels increase image quality, and
said printing engine prints said second bitmap to print said print job.

2. The printer according to claim 1, said processor automatically deletes said first bitmap before said printing engine prints said second bitmap.

3. The printer according to claim 1, said main color gamut includes a color distance threshold that expands an original color gamut of said printing engine by an acceptable error factor.

4. The printer according to claim 1, further comprising a user interface providing an option to change said pixel quantity threshold.

5. The printer according to claim 1, said first bitmap is for a single page of said print data, and said processor identifies image quality improvement pixels of said extended gamut that are outside said main color gamut individually for each page of said print data to evaluate whether to use said optional colors with said main colors on a page-by-page basis.

6. The printer according to claim 1, said main color gamut of said printing engine is all possible colors said printing engine can print using only said main colors.

7. The printer according to claim 1, said extended gamut is all possible colors said printing engine can print using said main colors and one of said optional colors.

8. A printer comprising:
a processor; and
a printing engine electrically connected to said processor, said printing engine comprising:
permanent color printing modules electrically connected to said processor; and replaceable printing modules electrically connected to said processor, said permanent color printing modules are permanently mounted within said printer, said permanent color printing modules contain main colors, each of said permanent color printing modules contains a single one of said main colors, said replaceable printing modules are temporarily mounted within said printer, said replaceable printing modules contain optional colors, each of said replaceable printing modules contains a single one of said optional colors, said optional colors are more expensive and are used less frequently than said main colors during printing operations, said processor receives a print job, said processor automatically raster image processes print data in said print job to produce a first bitmap for printing said print job with said main colors and one of said optional colors, said processor automatically converts said first bitmap into a standardized color space to produce an extended gamut of said first bitmap, said processor automatically identifies a main color gamut of said printing engine for printing with only said main colors, said processor automatically compares said extended gamut of said first bitmap and said main color gamut of said printing engine to identify image quality improvement pixels of said extended gamut that are outside said main color gamut, said processor compares the number of said image quality improvement pixels to a pixel quantity threshold to determine that said quality improvement pixels increase image quality when the number of said image quality improvement pixels exceed said pixel quantity threshold, said processor automatically raster image processes of said print data in said print job to produce a second bitmap having a higher resolution relative to said first bitmap either:

with said main colors and one of said optional colors, if said image quality improvement pixels increase image quality, or with only said main colors, if said image quality improvement pixels do not increase image quality, and said printing engine prints said second bitmap to print said print job.

9. The printer according to claim 8, said processor automatically deletes said first bitmap before said printing engine prints said second bitmap.

10. The printer according to claim 8, said main color gamut includes a color distance threshold that expands an original color gamut of said printing engine by an acceptable error factor.

11. The printer according to claim 8, further comprising a user interface providing an option to change said pixel quantity threshold.

12. The printer according to claim 8, said first bitmap is for a single page of said print data, and said processor identifies image quality improvement pixels of said extended gamut that are outside said main color gamut individually for each page of said print data to evaluate whether to use said optional colors with said main colors on a page-by-page basis.

13. The printer according to claim 8, said main color gamut of said printing engine is all possible colors said printing engine can print using only said main colors.

14. The printer according to claim 8, said extended gamut is all possible colors said printing engine can print using said main colors and one of said optional colors.

15. A method comprising:

receiving a print job into a printer having permanent color printing modules and replaceable printing modules, said permanent color printing modules are permanently mounted within said printer, said permanent color printing modules contain main colors, each of said permanent color printing modules contains a single one of said main colors, said replaceable printing modules are temporarily mounted within said printer, said replaceable printing modules contain optional colors, each said replaceable printing modules contains a single one of said optional colors, and said optional colors are more expensive and are used less frequently than said main colors during printing operations;

raster image processing print data in said print job using a processor of said printer to produce a first bitmap for printing said print job with said main colors and one of said optional colors, converting said first bitmap into a standardized color space using said processor to produce an extended gamut of said first bitmap, identifying a main color gamut of said printing engine for printing with only said main colors using said processor, comparing said extended gamut of said first bitmap and said main color gamut of said printing engine using said processor to identify image quality improvement pixels of said extended gamut that are outside said main color gamut, comparing the number of said image quality improvement pixels to a pixel quantity threshold using said processor to determine that said quality improvement pixels increase image quality when the number of said image quality improvement pixels exceed said pixel quantity threshold, raster image processing said print data in said print job using said processor to produce a second bitmap having a higher resolution relative to said first bitmap either:

with said main colors and one of said optional colors, if said image quality improvement pixels increase image quality; or with only said main colors, if said image quality improvement pixels do not increase image quality, and printing said second bitmap using said printing engine to print said print job.

16. The method according to claim 15, further comprising deleting said first bitmap using said processor before said printing engine prints said second bitmap.

17. The method according to claim 15, said main color gamut includes a color distance threshold that expands an original color gamut of said printing engine by an acceptable error factor.

18. The method according to claim 15, receiving, into a user interface of said printer, an option to change said pixel quantity threshold.

19. The method according to claim 15, said first bitmap is for a single page of said print data, and said comparing identifies image quality improvement pixels of said extended gamut that are outside said main color gamut individually for each page of said print data to evaluate whether to use said optional colors with said main colors on a page-by-page basis.

20. The method according to claim 15, said main color gamut of said printing engine is all possible colors said printing engine can print using only said main colors, and said extended gamut is all possible colors said printing engine can print using said main colors and one of said optional colors.

* * * * *